US005150870A

United States Patent [19]

Matsuura

[11] Patent Number: 5,150,870

[45] Date of Patent: Sep. 29, 1992

[54] VEHICLE SEAT

[75] Inventor: Hiroshi Matsuura, Washizu, Japan

[73] Assignee: Fujikiko Kabushiki Kaisha, Tokyo, Japan

[21] Appl. No.: 588,802

[22] Filed: Sep. 27, 1990

[30] Foreign Application Priority Data

Sep. 30, 1989 [JP] Japan ........................... 1-115177[U]

[51] Int. Cl.[5] ........................................ F16M 13/00

[52] U.S. Cl. .................................. 248/421; 248/419; 248/422

[58] Field of Search ............... 248/421, 422, 396, 371, 248/394, 419, 157

[56] References Cited

U.S. PATENT DOCUMENTS 4,643,383 2/1987 Fukuta ............................. 248/421
4,720,070 1/1988 Nishino ............................ 248/422
4,948,081 8/1990 Hatta ................................ 248/421
4,986,509 1/1991 Suzuki ............................... 248/422

FOREIGN PATENT DOCUMENTS 0173044 7/1985 European Pat. Off. .
0235793 3/1987 European Pat. Off. .
2578498 3/1985 France .

*Primary Examiner*—David L. Talbott
*Attorney, Agent, or Firm*—Hopkins & Thomas

[57] ABSTRACT

In a vehicle seat provided with a seat cushion height adjusting device, at least one seat lift handle (10A or 10B) and a seat lifting device (20) are assembled into a unit and removably mounted between a pair of seat base plates (40A and 40B), so that the additional seat cushion height adjusting device can be readily mounted under ordinary vehicle seats provided with no such adjusting device, thus standardizing the seat base plates to reduce the stock cost thereof.

1 Claim, 5 Drawing Sheets

VEHICLE SEAT

BACKGROUND OF THE INVENTION

1. Field of the Invention

The present invention relates to a vehicle seat provided with a seat lifting device for adjusting the height of the seat cushion.

2. Description of the Prior Art

There exists a certain conventional seat lifting device for an automotive vehicle which is mounted on a seat base plate of a vehicle seat, so that the height of a seat cushion from a vehicle body floor can be adjusted within a predetermined range to each driver's preferable height, according to the driver's stature or sitting height.

On the other hand, since there are vehicle seats provided with no such seat lifting device, conventionally seat base plates of different types are required separately, according to the presence or absence of the seat lifting device. However, where different seat base plates are required according to vehicle seats of different specifications, since various seat base plates must be prepared, there exists a problem in that the quality management is complicated and therefore the manufacturing cost is high.

SUMMARY OF THE INVENTION

With these problems in mind, therefore, the primary object of the present invention is to provide a vehicle seat provided with a unified seat lifting device so modified as to be readily attachable to the ordinary vehicle seat provided with no such seat lifting device.

To achieve the above-mentioned object, a vehicle seat according to the present invention having: (a) a seat cushion frame (60) for mounting a seat cushion (SC); (b) a pair of seat base plates (40A, 40B) arranged in parallel to each other at an interval; (c) at least one seat lift handle (10); and (d) a seat lifting device (20) actuated by the seat lift handle, for adjustably lifting the seat cushion frame, the at least one seat lift handle and the seat lifting device being assembled into a unit and removably mounted between a pair of the seat base plates. At least one seat lift handle is a seat front lift handle (10A) for adjustably moving up and down a front part of the seat cushion; and the seat lifting device comprises: (a) a pair of mounting frames (22A, 22B) fixed to an inside surface of one (40A) of the seat base plates, for rotatably supporting an axle (24A) of the seat front lift handle (10A); (b) a front pinion gear (25A) rotatably supported between the two mounting frames and fixed to the seat front lift handle coaxially therewith; (c) a front sector gear (26A) rotatably supported between the two mounting frames in mesh with the front pinion gear; (d) a front spring brake mechanism (27A) fixed on an outside surface of the mounting frame coaxially with the seat front lift handle; (e) a front shaft (30A) rotatably supported between the two seat base plates (40A, 40B) under the front part of the seat cushion frame and coaxially with the front sector gear; (f) a front sector gear link (31A) for linking the front sector gear (26A) with the front shaft (30A); and (g) at least two front shaft link levers (31, 29, 32, 33) connected between the front shaft (30A) and the seat cushion frame (60), for moving up and down the front part of the seat frame when the seat front lift handle is rotated. Further, in usual the vehicle seat further comprises: (a) a seat rear lift handle (10B) rotatably supported by said mounting frame, for adjustably moving up and down a rear part of the seat cushion; (b) a rear pinion gear (25B) rotatably supported between the two mounting frames and fixed to the seat rear lift handle coaxially therewith; (c) a rear sector gear (26B) rotatably supported between the two mounting frames in mesh with the rear pinion gear; (d) a rear spring brake mechanism (27B) fixed on an outside surface of the mounting frame coaxially with the seat rear lift handle; (e) a rear shaft (30B) rotatably supported between the two seat base plates (40A, 40B) under the rear part of the seat cushion frame; (f) a rear sector gear link (34) for linking the rear sector gear (26B) with the rear shaft (30B); and (g) at least two rear shaft link levers (35, 36) connected between the rear shaft (30B) and the seat cushion frame (60), for moving up and down the rear part of the seat frame when the seat rear handle is rotated. The mounting frames (22) for housing the two pinion gears (25A, 25B) and the two sector gears (26A, 26B) are disposed on an inside surface of the seat base plate (40A). The two spring brake mechanisms (27A, 27B) and the two seat lift handles (10A, 10B) are disposed over and outside the seat base plate (40A).

In the vehicle seat according to the present invention, since the seat lifting handles and the seat lifting device are formed into a unit, it is possible to readily realize vehicle seats of different specifications (e.g. provided with or without the seat lifting device) by mounting or removing the unified seat lifting device on or from the seat base plates. Since common seat base plates can be used for various vehicle seats of different types, it is possible to reduce the stock cost thereof.

DETAILED DESCRIPTION OF THE PREFERRED EMBODIMENTS

Figure 1:
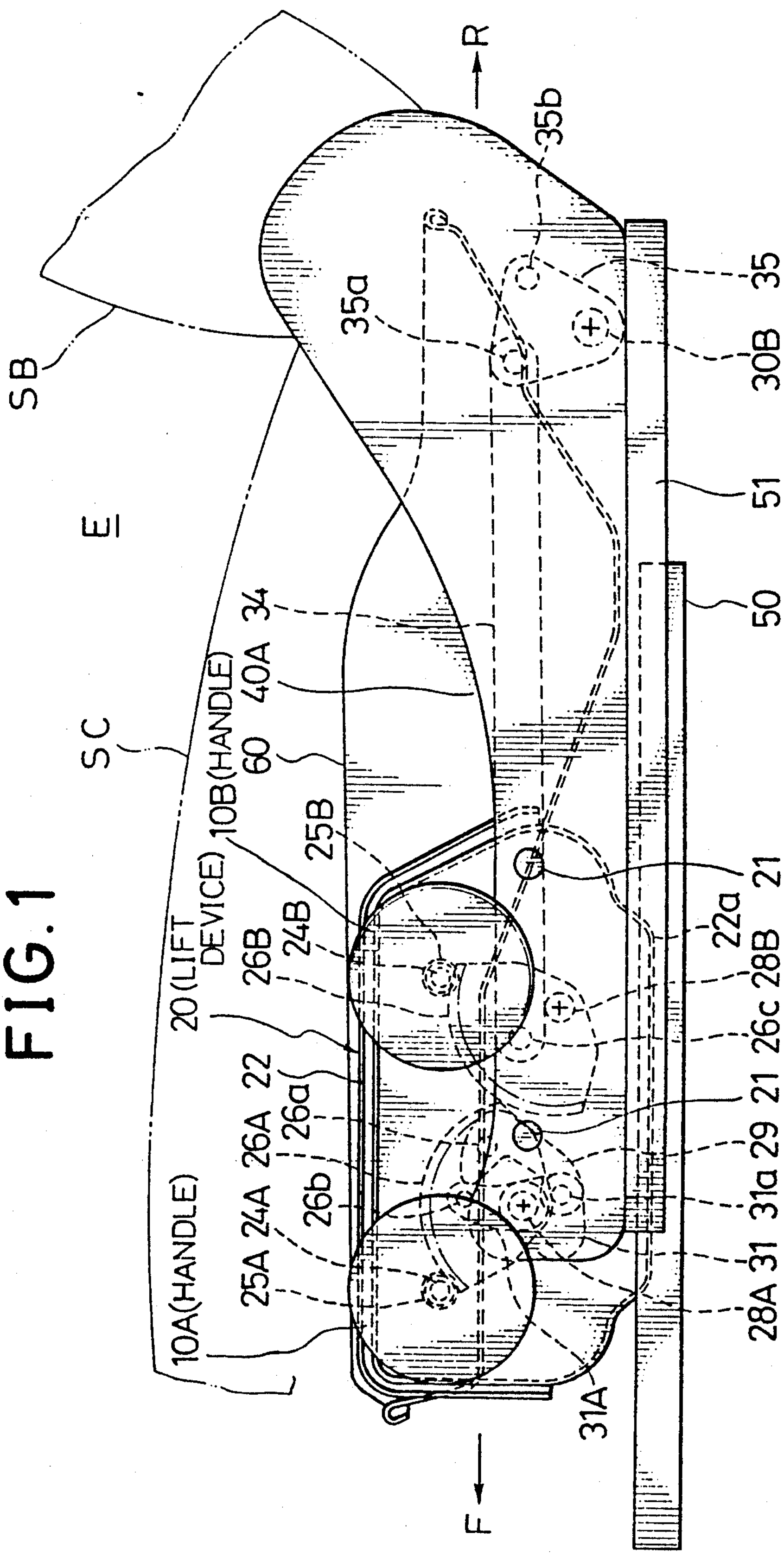
FIG. 1 is a side view showing the vehicle seat provided with the seat lift handles and the seat lifting device according to the present invention.

The embodiments of the vehicle seats according to the present invention will be described hereinbelow with reference to the attached drawings.

The vehicle seat E of the present invention is so constructed that the front and rear parts of a seat cushion SC can be moved up and down by rotating two seat lift handles 10A and 10B respectively in the clockwise or counterclockwise directions.

The feature of the vehicle seat according to the present invention is to unify the two seat lift handles 10A and 10B and a seat lifting device 20 so as to be mounted between two seat base plates 40A and 40B. The seat lifting device 20 transmits a force to move the seat cushion up and down in linkage with the rotative motion of the seat lift handle 10A or 10B.

The construction of the vehicle seat according to the present invention will be described in further detail hereinbelow.

A pair of lower rails 50 as the seat slide device are arranged on a vehicle floor (not shown) extending in the vehicle front and rear direction (the arrow directions F and R) with a predetermined interval. Further, a pair of upper rails 51 are slidably engaged with the outside surfaces of the lower rails 50, respectively. A pair of seat base plates 40A and 40B are fixed to the upper rails 51, respectively. A seat cushion frame 60 (see FIGS. 4 and 5) for fixing the seat cushion SC is supported between these two seat base plates 40A and 40B via the seat lifting device 20. A seat back SB tiltable through a predetermined angle in the front and rear direction is supported between the two seat base plates 40A and 40B via a reclining device (not shown).

Two pinion gears 25A and 25B and two sector gears 26A and 26B of the seat lifting device 20 are housed between a pair of mounting frames 22A and 22B, and two axles 24A and 24B of the two seat lift handles 10A and 10B are rotatably supported by the mounting frames 22A and 22B. The mounting frames 22A and 22B are fixed to the inside surface of the base plate 40A with two caulked pins 21. Further, two spring braking mechanisms 27A and 27B are fixed on the outside surface of the mounting frame 22B coaxially with the seat lift handles 10A and 10B, respectively. The spring braking mechanism 27A or 27B is a flat spiral spring, for instance whose outer end is connected to the mounting frame 22B and whose inner end is free in contact with the outer circumferential surface of the axle 24A or 24B of the seat lift handle 10A or 10B. When the seat lift handle 10A or 10B is rotated clockwise, for instance to move up the seat cushion frame 60, since the inner end of the spiral spring is slid on the axle 24A or 24B in the winding off direction, the seat lift handle 10A or 10B is rotatable. However, when a strong torque by the driver's weight on the basis of the leverage action is momentarily applied to the axle 24A or 24B in the winding up direction (counterclockwise direction of the seat lift handle 10A or 10B), a braking force can be generated between the spiral spring and the axle 24A or 24B because the spring is wound up by the axle 24A or 24B by frictional force. In this connection, when the seat lift handle 10A or 10B is rotated counterclockwise to move down the seat cushion frame 60, since the axle 24A or 24B is rotated slowly in winding up direction in contact with the inner end of the spiral spring, the spiral spring can be slipped on the axle smoothly without generating a brake force.

The two pinion gears 25A and 25B are fixed to the two axles 24A and 24B, respectively and rotatably supported between the two mounting frames 22A and 22B coaxially with the seat lift handles 10A and 10B.

The two sector gears 26A and 26B are fixed to two axles 28A and 28B, respectively and also rotatably supported between the two mounting frames 22A and 22B in mesh with the pinion gears 25A and 25B, respectively.

Further, the outer circumferential edge portion of the mounting frame 22A is bent for protection of the seat cushion SC from damage. In this embodiment, since these various gears are covered by the mounting frames 22, no gear cover is additionally required.

Further, the lower end portion of the two mounting frames 22A and 22B extends toward the upper rail 51 to such an extent that the extension portion 22*a* thereof is brought into contact with the side surface of the upper rail 51, in order to increase the rigidity of the mounting frames 22 in the transversal direction.

Figure 2:
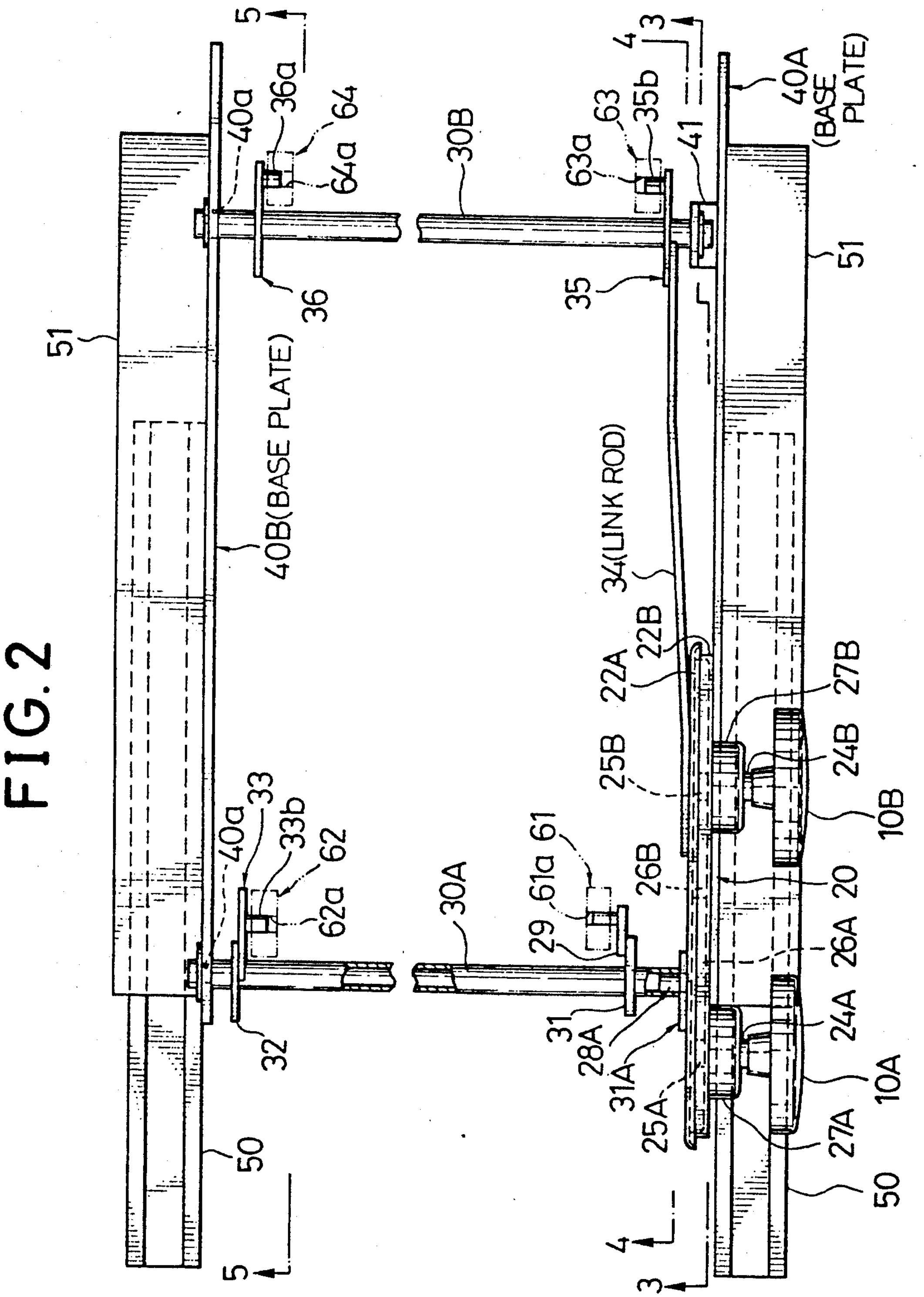
FIG. 2 is a plan view showing the vehicle seat according to the present invention.

As depicted in FIG. 2, one end of a pipe-shaped front shaft 30A is pivotally supported by the axle 28A, and the other end of the front shaft 30A is pivotally supported by a hole 40*a* formed in the seat base plate 40B, so that the front shaft 30A is pivotally supported between the mounting frame 22A and the seat base plate 40B. A front sector gear link member 31A (shown in FIGS. 1 and 2) fixed to the front shaft 30A is linked with the front sector gear 26A via a pin 26*b* (see FIG. 1).

Figure 4:
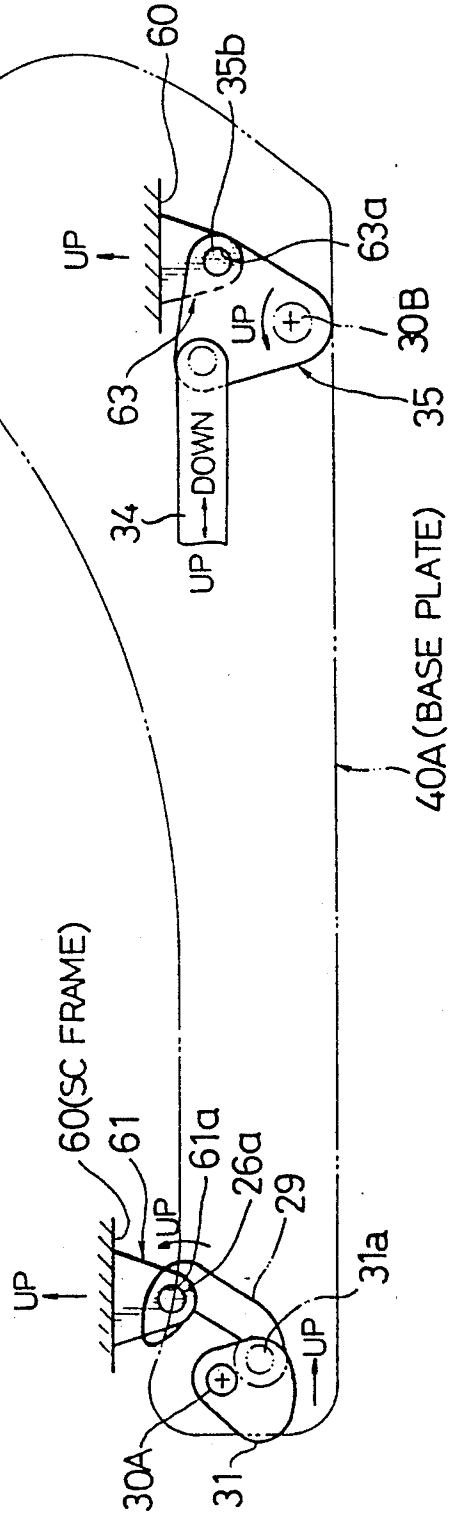
FIG. 4 is a similar side view when seen from the line 4—4 in FIG. 2.

As depicted in FIG. 4, a first front link lever 31 is fixed to the front shaft 30A. A second front link lever 29 is connected to the first front link lever 31 via a pin 31*a*. A pin 26*a* fixed to an end of the second front link lever 29 is pivotally linked with a hole 61*a* formed in a bracket 61 fixed to the front portion of the seat cushion frame 60.

Figure 5:
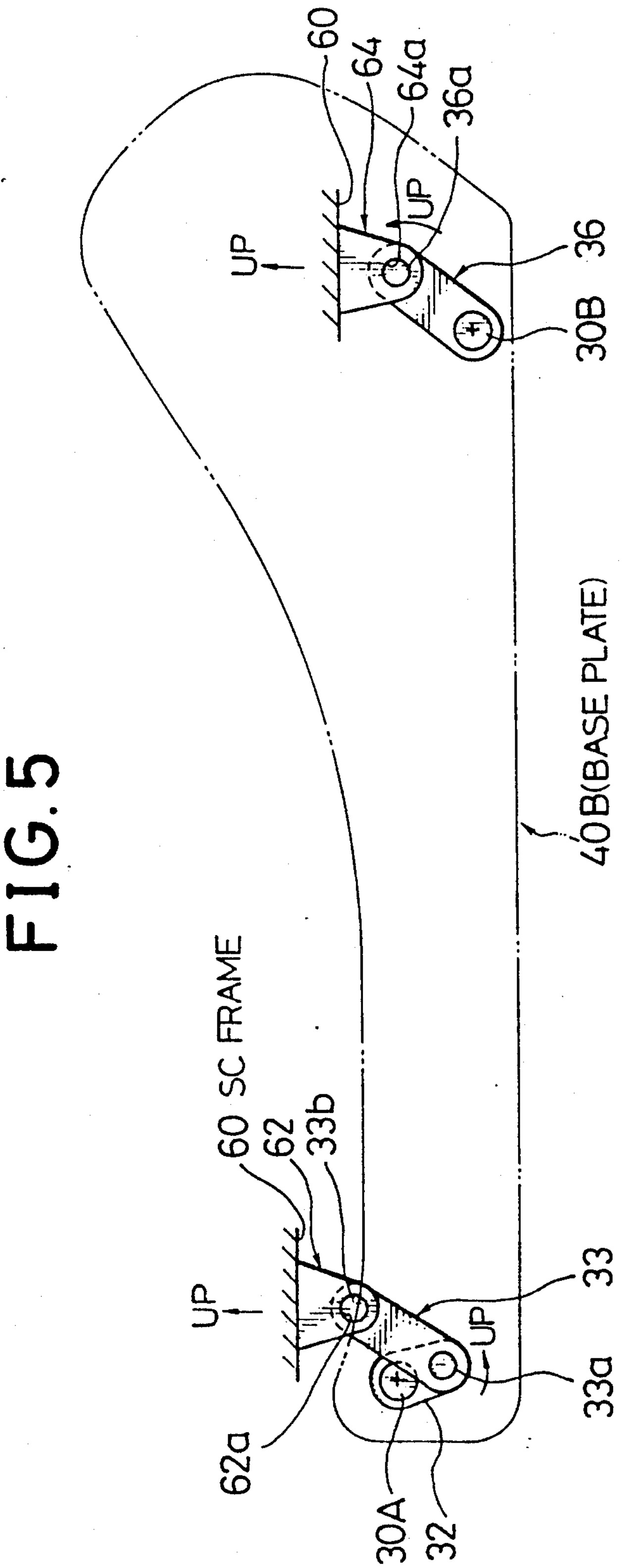
FIG. 5 is a similar side view when seen from the line 5—5 in FIG. 2.

Similarly, as depicted in FIG. 5, a third front link lever 32 similar to the first front link lever 31 in the leverage dimension is fixed to the front shaft 30A. A fourth front link lever 33 similar to the second front link lever 29 in the leverage dimension is connected to the third front link lever 32 via a pin 33*a*. A pin 33*b* fixed to an end of the fourth front link lever 33 is pivotally linked with a hole 62*a* formed in a bracket 62 fixed to the front portion of the seat cushion frame 60.

As depicted in FIG. 2, one end of a rear shaft 30B is pivotally supported by a hole formed in a bracket 41 fixed to the seat base plate 40A and the other end of the rear shaft 30B is pivotally supported by a hole 40*a* formed in the seat base plate 40B, so that the rear shaft 30B is pivotally supported between the two seat base plates 40A and 40B.

Figure 3:
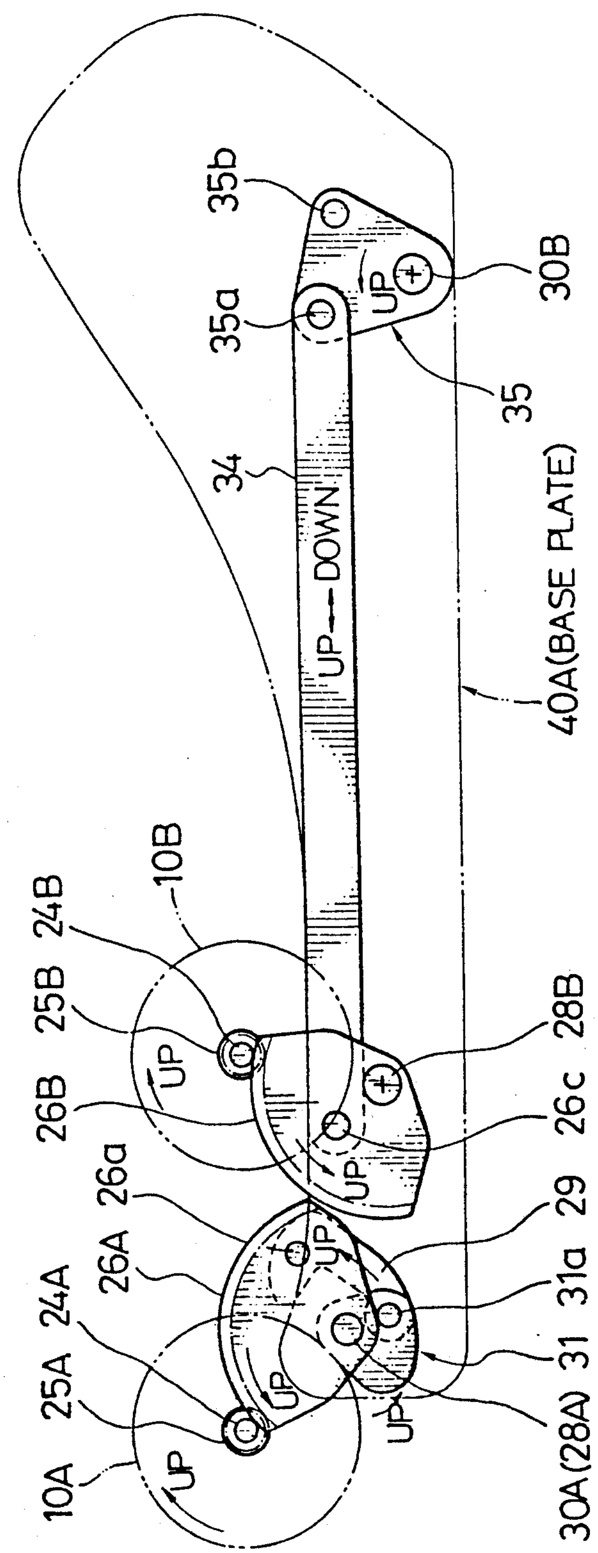
FIG. 3 is, a side view showing the seat lifting device according to the present invention when seen from the line 3—3 in FIG. 2.

As shown in FIG. 3, a front end of a rear sector gear link 34 is connected to the rear sector gear 26B via a pin 26*c*. As shown in FIG. 4, a first rear link lever 35 is fixed to the rear shaft 30B.

A rear end of the rear sector gear link 34 is connected to the first rear link lever 35 via a pin 35*a*. A pin 35*b* fixed to an end of the first rear link lever 35 is pivotally linked with a hole 63*a* a formed in a bracket 63 fixed to the rear portion of the seat cushion frame 60.

Similarly, as depicted in FIG. 5, a second rear link lever 36 similar to the first rear link lever 35 in leverage dimension is fixed to the rear shaft 30B. A pin 36*a* fixed to an end of the second rear link lever 36 is pivotally linked with a hole 64*a* formed in a bracket 64 fixed to the rear portion of the seat cushion frame 60.

The operation of the seat height adjusting device of the vehicle seat will be described hereinbelow.

When the front seat lift handle 10A is rotated clockwise in FIGS. 1 and 3, since the front sector gear 26A is rotated counterclockwise via the front pinion gear 25A, the front shaft 30A coaxial with the axle 28A of the front sector gear 26A also rotates counterclockwise because the shaft 30A is linked with the sector gear 26A by the front sector gear link 31A. Therefore, the four front shaft link levers 31, 29, 32 and 33 (FIGS. 4 and 5) also rotate counterclockwise to move up the seat cushion frame 60, so that the front part of the seat cushion SC is adjustably moved in the upward direction. The driver's weight applied to the seat cushion frame 60 can be received by the front spring braking mechanism 27A.

In contrast with this, when the front seat lift handle 10A is rotated counterclockwise in FIGS. 1 and 3, since the front sector gear 26A is rotated clockwise via the front pinion gear 25A, the front shaft 30A coaxial with the axle 28A of the front sector gear 26A rotates also clockwise. Therefore, the four front shaft link levers 31, 29, 32 and 33 also rotate clockwise to move down the seat cushion frame 60, so that the front part of the seat cushion SC is adjustably moved in the downward direction.

Further, when the rear seat lift handle 10B is rotated clockwise in FIGS. 1 and 3, since the rear sector gear 26B is rotated counterclockwise via the rear pinion gear 25B, the rear sector gear link 34 is moved leftward in FIG. 3. Therefore, the rear shaft 30B is rotated counterclockwise via the first rear shaft link lever 35 to move up the seat cushion frame 60 in cooperation with the second rear shaft link lever 36, so that the rear part of the seat cushion SC is adjustably moved in the upward direction. The driver's weight applied to the seat cushion frame 60 can be received by the rear spring braking mechanism 27B.

In contrast with this, when the rear seat lift handle 10B is rotated counterclockwise in FIGS. 1 and 3, since the rear sector gear 26B is rotated clockwise via the rear pinion gear 25B, the rear sector gear link 34 is moved rightward in FIG. 3. Therefore, the rear shaft 30B is rotated clockwise via the first rear shaft link lever 35 to move down the seat cushion frame 60 in cooperation with the second rear shaft link lever 36, so that the rear part of the seat cushion SC is adjustably moved in the downward direction.

In the above-mentioned embodiment, since the two lift handles 10A and 10B and the gear sections of the seat cushion lifting device 20 are unified and housed within the two mounting frames 22A and 22B and additionally the mounting frame 22 is fixed to the seat base plate 40A, it is possible to simply assemble vehicle seats E of two different specifications or types by mounting or removing the mounting frames 22 on or from the seat base plate 40A and two shafts 30A and 30B between the two seat base plates 40A and 40B. In other words, since the common seat base plate 40A can be used for vehicle seats of different models, it is possible to reduce the quality management cost. In the above embodiments, although two seat lift handles 10A and 10B are provided for the vehicle seat to adjustably move up and down both the front and rear portions of the seat cushion, it is of course possible to adjustably move up and down only the front or rear portion of the seat cushion by providing only the one seat lift handle and the related parts.

As described above, in the vehicle seat according to the present invention, since the lift handles and the seat cushion lifting device are assembled into a unit, it is possible to assemble vehicle seats of different types by simply mounting or removing the unified assembly on or from the seat base plate, thus reducing the manufacturing and stock cost thereof.

While the foregoing embodiment of the invention has been shown and described in detail, it should be understood by those skilled in the art that variations and modifications of the disclosed embodiment can be made without departing from the spirit and scope of the invention.

What is claimed is:

1. A vehicle seat comprising:

a seat cushion frame for mounting a seat cushion having a front and a rear portion, a pair of seat base plates arranged parallel to and spaced from each other, front and rear seat lift handles, front and rear seat lifting devices actuated by said front and rear seat lift handles, respectively, for adjustably lifting said front and rear portions, respectively, of the seat cushion, and first and second spaced mounting frames removably affixed to an inside surface of one of said seat base plates for pivotably supporting said front and rear seat lift handles, a front shaft rotatably supported between said pair of base plates under the front portion of said seat cushion frame, means for rotating said front shaft rotatably supported between said first and second mounting frames, a rear shaft rotatably supported between said pair of base plates under the rear portion of said seat cushion frame, and means for rotating said rear shaft rotatably supported between said first and second mounting frames, whereby the pair of mounting frames can be assembled as one unit and removably mounted between a pair of said seat base plates in such a manner that the front and rear seat lift handles are disposed over and about one of said seat base plates.

* * * * *